3,058,808
PRODUCTION OF CHLORINE DIOXIDE
Franklin M. Ernest, Syracuse, N.Y., assignor to Allied Chemical Corporation, New York, N.Y., a corporation of New York
No Drawing. Filed Sept. 24, 1959, Ser. No. 841,947
4 Claims. (Cl. 23—152)

This invention relates to an improved process for the production of chlorine dioxide. It relates more particularly to improvements in the generation of chlorine dioxide from a water-soluble chlorate by a process wherein an organic reducing agent is reacted with acidified aqueous chlorate solution, and especially wherein an aqueous solution of sodium chlorate acidified with sulfuric acid is reacted with methanol to produce chlorine dioxide.

It is known to produce chlorine dioxide by reacting a water-soluble chlorate, such as, an alkali metal chlorate, an alkaline earth metal chlorate or magnesium chlorate, with an organic reducing agent in an acidic aqueous medium, and especially one strongly acidified with sulfuric acid.

An advantageous method for carrying out the reaction, and especially the reaction of methanol with sodium chlorate in an aqueous solution acidified with sulfuric acid, is disclosed in U.S. Patent 2,881,052 of Arlie P. Julien and Stuart M. Rogers.

In order to recover the chlorine dioxide formed, it has been the general practice to strip the chlorine dioxide from the reaction mixture by passing a gas, such as air or nitrogen, through the reaction mixture, and recover the chlorine dioxide from the resulting gas mixture of chlorine dioxide and air or nitrogen by absorbing it in water. Owing to the explosive nature of chlorine dioxide, excessive volumes of the diluting gas are required, resulting in inefficient or costly recovery of the chlorine dioxide.

According to the present invention, chlorine dioxide formed by the reaction of an organic reducing agent, and especially methanol, with an acidified aqueous chlorate solution is removed from the aqueous reaction mixture by passing chlorine from an external source into the reaction mixture, thereby forming a chlorine-chlorine dioxide gaseous mixture, and withdrawing the gaseous mixture from the reaction mixture. In order to avoid hazardous conditions under normal temperature conditions, sufficient chlorine is employed to maintain a concentration of chlorine in the resulting gaseous mixture of at least 3 parts by volume per part by volume of chlorine dioxide.

I have discovered that the use of chlorine as a transporting medium for the chlorine dioxide produced by such a reaction does not interfere with, or adversely affect, the chlorine dioxide generating reaction, and results in a product having advantageous properties. This result is surprising because it was to have been anticipated that the presence of the large amounts of chlorine employed in the process of the present invention would interfere with the reducing action of the organic reducing agents and especially methanol, and lead to a decrease in the yield of chlorine dioxide and the formation of harmful by-products.

Among the advantages resulting from the process is the usefulness of the chlorine-chlorine dioxide mixture itself as a bleaching agent. When used for the bleaching of wood pulp, for example, no separate recovery of chlorine dioxide is necessary, as was the case heretofore; the chlorine-chlorine dioxide mixture produced by the process of the present invention can be employed directly as formed, or it can be converted to a storable liquid by compressing and cooling the mixture removed from the chlorine dioxide generator, after drying to eliminate water vapor present therein (for example by contacting the gas with concentrated sulfuric acid).

If it is desired to employ the chlorine dioxide separately from the chlorine, the gaseous mixture can be separated into its components. The separation can be accomplished, for example, by passing the mixture through a water scrubber wherein the chlorine dioxide and a part of the chlorine are absorbed. The chlorine dioxide can be further separated from the major part of the remaining chlorine in the resulting aqueous solution by air stripping, if desired; for example, by passing air through a body of the resulting aqueous solution (e.g., in a tower), whereby the chlorine dioxide and some chlorine are removed in admixture with the air, and scrubbing the resulting air-chlorine dioxide mixture with water to form a chlorine dioxide aqueous solution. The resulting air, containing some unabsorbed chlorine dioxide and some chlorine, can be recirculated for reuse in the stripper, thereby avoiding loss of chlorine and chlorine dioxide. Such a separation procedure has the advantage of employing a closed circulation of air as the transporting medium for the recovered chlorine dioxide, thereby avoiding contamination of the atmosphere which would result from discharge of the exit gases to the atmosphere.

The chlorine obtained by such separation can itself be employed for bleaching or other purposes, or it can be recirculated to the chlorine dioxide generator for repeated use in the process.

Aside from the use of chlorine as a transporting medium for the chlorine dioxide, the process for generating chlorine dioxide can be carried out in the various ways heretofore known to the art.

Thus, in the practice of the present invention, chlorine dioxide is generated by the reduction of chlorate in an acidic aqueous solution by reaction with an organic reducing agent, and the chlorine dioxide formed as a result of the reduction is removed from the reaction mixture by introducing into the aqueous reaction mixture containing the chlorine dioxide, chlorine from an external source; that is, from a source external of the reaction mixture or other than the reaction mixture. The chlorine can be introduced in the form of gas, or of liquid with heating to convert it to gas; it is preferably introduced in the gas form. The chlorine gas passes through the reaction mixture and is then removed, carrying the chlorine dioxide with it; so that the chlorine dioxide is stripped from the reaction mixture in the form of a gaseous mixture with the chlorine. The amount of chlorine is controlled so that the concentration of chlorine dioxide in the exit gas mixture is maintained within safe limits, and preferably the amount of chlorine introduced is at least sufficient to provide a concentration of chlorine in the resulting gas mixture of at least 3 volumes of chlorine per volume of chlorine dioxide (a maximum concentration of chlorine dioxide in the gas mixture of 25% by volume).

The conditions for the generation of chlorine dioxide from acidified chlorate solution by reaction with an organic reducing agent are well known and any suitable conditions desired may be employed in the practice of the present invention. The invention is of particular value in connection with the reduction of aqueous chlorate solution acidified with sulfuric acid with the aid of methanol as the reducing agent.

The chlorine dioxide generation may be carried out as a batch process or as a continuous process. It is advantageously carried out under the reaction conditions of U.S. Patent 2,881,052, referred to above.

For example, in the practice of the present invention, a strongly acidic aqueous chlorate solution, resulting from the acidification of aqueous sodium chlorate with sulfuric acid, is partially reduced to chlorine dioxide by reaction with a limited amount of methanol in a reaction medium consisting of a strongly acidic aqueous chlorate solution containing, per 100 parts by weight of solution, 3 to 9 parts of $ClO_3$, and 10 to 50 parts of $SO_4$, and which has been produced by reduction of a sulfuric acid-acidified aqueous sodium chlorate solution with methanol; and further reduction of the chlorate remaining in the resulting partially reduced strongly acidic aqueous chlorate solution is effected by reaction with additional methanol, preferably in a similar reaction medium containing, per 100 parts by weight of solution, 0.2 to 2 parts of $ClO_3$ and 10 to 50 parts of $SO_4$, at a more elevated temperature, if necessary. Chlorine dioxide formed in the reaction media is removed by passing gaseous chlorine through the reaction media.

In the practice of the present invention in accordance with a preferred procedure, sodium chlorate is dissolved in water to form an aqueous sodium chlorate solution, the resulting solution is mixed with dilute sulfuric acid, methanol is added, and a stream of chlorine gas from an external source is introduced into the reaction mixture. The amount and concentration of the sulfuric acid solution is so proportioned to the amount and concentration of sodium chlorate solution as to provide a mixture which advantageously contains 10 to 25 parts, and preferably about 15 parts, of $ClO_3$ per 100 parts by weight of a solution which is strongly acid and which preferably contains a weight ratio of $ClO_3$ to $SO_4$ of about 1:2. The methanol reacts with the strongly acidic aqueous chlorate solution to form chlorine dioxide, which is removed with the chlorine as exit gases, the strongly acidic aqueous chlorate solution being partially reduced by reaction with the methanol, while maintaining the desired reaction temperature, until the concentration of $ClO_3$ in the solution is decreased to about 3 to 9 parts, and preferably between 5 and 7 parts, per 100 parts by weight of solution.

The chlorate solution is preferably maintained at a temperature of 20° to 60° C., and more advantageously 50° to 60° C. While for efficient operation, temperatures near the upper limit are preferred, safe temperatures should not be exceeded.

When the concentration of $ClO_3$ in the solution has decreased to about 3 to 9 parts per 100 parts by weight of solution, the partially reduced chlorate solution is employed as reaction medium for the reduction of additional chlorate. Thus, aqueous chlorate solution, methanol and sulfuric acid are added to the partially reduced chlorate solution in suitable proportions, preferably in the above weight ratio of $ClO_3$ to $SO_4$, and a portion of the reacted mixture is bled from the reactor. The specific $ClO_3$ concentration and rates of feed of the chlorate solution and the sulfuric acid employed for this purpose will depend upon the desired rate of evolution of chlorine dioxide. The rate of methanol feed will be correlated thereto, being preferably a weight ratio of methanol to $ClO_3$ of 1:5 to 1:20, per unit of time. To insure complete reaction of the methanol and efficient generation of chlorine dioxide, the weight of methanol employed relative to the weight of $ClO_3$ in the chlorate solution in the reactor is only a fraction of the amount theoretically required to react with all of the chlorate present in the reactor.

Methanol can be charged to the reactors in liquid or vapor form. Preferably liquid methanol is added jointly with the aqueous chlorate solution.

The amount of chlorine employed is controlled so that the concentration of chlorine dioxide in the exit gases is maintained within safe limits, e.g., not exceeding 25% by volume (the partial pressure of $ClO_2$ does not exceed 190 mm. Hg), and preferably is 10% to 17% by volume (a partial pressure of $ClO_2$ of 76 mm. to 130 mm.).

Various forms of apparatus may be employed in carrying out the process of the present invention.

For simplicity of operation, the reaction is carried out in a body of partially reduced acidified chlorate solution maintained at the desired temperature by cooling or heating, as required, to which aqueous chlorate solution containing methanol and sulfuric acid are separately charged continuously in the proportions referred to above, while passing a stream of chlorine from an external source into the reaction mixture.

One form of apparatus suitable for carrying out the process comprises a vertical cylindrical reactor designed to operate in a flooded condition and provided with suitable temperature control means, such as a jacket, to which steam for heating or water for cooling can be supplied. Sulfuric acid of suitable concentration and aqueous chlorate solution are separately supplied to the reaction vessel by means of suitable inlets at the bottom of the vessel, such as nozzles. Methanol is conveniently introduced into the reactor as part of the aqueous chlorate solution. Chlorine is introduced into the reactor through a central inlet in the bottom of the reactor, such as a nozzle, and exit gases are removed from the top of the reactor through a suitable outlet.

For efficient continuous operation the reactor is provided with a liquid outlet in a side wall thereof, near the top, from which spent acidified chlorate solution overflows.

If it is desired to produce additional chlorine dioxide from unreacted chlorate contained in the spent acidified chlorate solution, this can be done by charging the spent solution into a second, similar reaction vessel jointly with additional methanol (for example, about 28% of the charge to the first reactor), and separately introducing sufficient additional sulfuric acid to provide the acidity set forth above (for example, about 11% of the acid charged to the first reactor) while passing chlorine through the second reactor.

In order to establish a body of partially reacted acidified chlorate solution in the primary reactor upon starting up a run, the primary reactor can be charged with aqueous sulfuric acid solution and an aqueous solution of sodium chlorate. Then an aqueous solution of sodium chlorate containing liquid methanol can be introduced into the bottom of the reactor through one inlet, and sulfuric acid can be introduced in the proper proportion through the other inlet. The evolution of chlorine dioxide starts almost immediately and chlorine gas is introduced through its inlet and rises through the reaction mixture, scrubbing the chlorine dioxide from the reaction mixture. The evolution of chlorine dioxide continues with reduction of the chlorate while maintaining the temperature of the reaction mixture at about 50° to 60° C. by external cooling of the reaction mixture. When the desired reduction of chlorate has been effected, additional methanol-containing aqueous chlorate solution and sulfuric acid are fed separately to the reaction mixture in the desired proportions, and incompletely reacted acidified chlorate solution overflows at substantially 85% of the rate of input of sulfuric acid and aqueous chlorate solution.

The invention will be illustrated by the following specific examples, but it is to be understood that it is not limited to the details thereof and that changes may be made without departing from the scope of the invention. The parts are by weight and the temperatures are in degrees centigrade.

*Example 1*

Two hundred-fifty milliliters of 19 Normal sulfuric acid (prepared by mixing equal volumes of 96% sulfuric acid and water) were mixed with 250 ml. of aqueous sodium chlorate solution containing 40 grams of sodium chlorate. The mixture was introduced into a generator of the type referred to above, the jacket of which was provided with water for cooling the reaction mixture, and to it were continuously added simultaneously an aqueous sodium chlorate solution, containing 380 g.p.l. of sodium chlorate and 38 g.p.l. of methanol, at the rate of 2.1 ml. per minute and 77.7% sulfuric acid at the rate of 0.9 ml. per minute. Chlorine gas was passed into the reaction mixture at the rate of 1.225 liters per minute. The reaction was permitted to proceed while maintaining the temperature between 50° to 60° by cooling. Chlorine dioxide generated during this stage of the reduction was removed jointly with the chlorine passing through the generator. The rate of introduction of chlorine was sufficient to provide an exit gas mixture containing a minimum of 8.9 volumes of chlorine per volume of chlorine dioxide.

The reaction mixture soon attained a partially reduced state, and the above feeds were continued at the above rates with maintenance of the temperature in the generator at about 58°, and with overflow of reduced reaction mixture from the generator at a rate adapted to maintain a substantially constant level of reaction mixture in the generator near the top of the generator. The exit gases passing from the generator contained 9.82 mol. percent of chlorine dioxide and 87.3 mol percent of chlorine.

*Example 2*

Part A.—The process of Example 1 was repeated with the following feed of materials:

Aqueous sodium chlorate
 solution containing
 methanol _____ 2.15 milliliters per minute.
Sulfuric acid _____ 0.9 milliliter per minute.
Chlorine _____ 0.370 liter per minute.

The composition of the exit gas was 22.0 mol percent of chlorine dioxide and 74.2 mol percent of chlorine.

Part B.—For purposes of comparison, the process of this example was repeated, but with the substitution of air-stripping instead of chlorine-stripping; air at the rate of 0.400 liter per minute was introduced instead of the chlorine. The feed of the materials was as follows:

Aqueous sodium chlorate
 solution containing
 methanol _____ 1.95 milliliters per minute.
Sulfuric acid _____ 0.95 milliliter per minute.
Air _____ 0.400 liter per minute.

The resulting exit gas contained 21.8 mol percent of chlorine dioxide and 0.55 mol percent of chlorine, besides air. Thus, the use of chlorine as stripping gas, instead of air, did not adversely affect the yield of chlorine dioxide.

I claim:

1. In the production of chlorine dioxide by reaction of an organic reducing agent with acidified aqueous chlorate solution whereby an aqueous reaction mixture containing chlorine dioxide is formed, the improvement which comprises removing chlorine dioxide from said reaction mixture by passing chlorine from an external source into said mixture in sufficient amount to form a chlorine-chlorine dioxide gaseous mixture containing at least 3 volumes of chlorine per volume of chlorine dioxide, while maintaining said reaction mixture at a temperature of about 50° to 60° C., and withdrawing said gaseous mixture from the aqueous reaction mixture.

2. In the production of chlorine dioxide by reaction of an organic reducing agent with a sulfuric acid-acidified solution of a water-soluble chlorate, the improvement which comprises passing gaseous chlorine from an external source into the reaction mixture containing chlorine dioxide as the result of said reaction to remove said chlorine dioxide and form a chlorine-chlorine dioxide gaseous mixture, while maintaining said reaction mixture at a temperature of about 50° to 60° C., controlling the amount of chlorine to provide a chlorine concentration in the resulting gaseous mixture of at least 3 volumes per volume of chlorine dioxide, and withdrawing said gaseous mixture from the reaction mixture.

3. In the production of chlorine dioxide by reaction of methanol with an aqueous sulfuric acid-acidified solution of a water soluble chlorate under chlorine dioxide-forming conditions, the improvement which comprises removing said chlorine dioxide from the reaction mixture in the form of a chlorine-chlorine dioxide gaseous mixture by passing chlorine from an external source into the reaction mixture in sufficient amount to form a chlorine-chlorine dioxide gaseous mixture containing at least 3 volumes of chlorine per volume of chlorine dioxide, while maintaining said reaction mixture at a temperature of about 50° to 60° C., and withdrawing said gaseous mixture from the reaction mixture.

4. In the production of chlorine dioxide by reaction of methanol with an aqueous sulfuric acid-acidified solution of sodium chlorate under chlorine dioxide-forming conditions, the improvement which comprises removing chlorine dioxide from the reaction mixture in the form of a chlorine-chlorine dioxide gaseous mixture by passing chlorine from an external source through the reaction mixture while maintaining said reaction mixture at a temperature of about 50° to 60° C., the amount of chlorine being sufficient to maintain a concentration of chlorine in the gaseous mixture of at least 3 volumes per volume of chlorine dioxide.

References Cited in the file of this patent

UNITED STATES PATENTS

| | | |
|---|---|---|
| 2,678,922 | Stone | May 18, 1954 |
| 2,736,636 | Day et al. | Feb. 28, 1956 |
| 2,895,801 | Northgraves et al. | July 21, 1959 |